US006729893B2

(12) United States Patent
Ezaki

(10) Patent No.: US 6,729,893 B2
(45) Date of Patent: May 4, 2004

(54) CARD EJECTOR

(75) Inventor: Masakazu Ezaki, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 10/117,090

(22) Filed: Apr. 8, 2002

(65) Prior Publication Data

US 2002/0160639 A1 Oct. 31, 2002

(30) Foreign Application Priority Data

Apr. 26, 2001 (JP) .................................... 2001-128566

(51) Int. Cl.[7] ............................................. H01R 13/62
(52) U.S. Cl. .................................. 439/159; 439/160
(58) Field of Search ............................. 439/159, 160, 439/152–158, 372

(56) References Cited

U.S. PATENT DOCUMENTS

| | | | | |
|---|---|---|---|---|
| 5,667,396 A | * | 9/1997 | Pan et al. ................... | 439/160 |
| 6,095,835 A | * | 8/2000 | Oguchi ........................ | 439/159 |
| 6,113,403 A | * | 9/2000 | Oguchi ........................ | 439/159 |
| 6,162,075 A | * | 12/2000 | Hara et al. .................. | 439/159 |
| 6,319,029 B2 | * | 11/2001 | Nishioka ..................... | 439/159 |
| 6,527,568 B2 | * | 3/2003 | Nakamura ................... | 439/159 |

FOREIGN PATENT DOCUMENTS

JP    11-219756    8/1999

* cited by examiner

*Primary Examiner*—Hien Vu
(74) *Attorney, Agent, or Firm*—Kanesaka & Takeuchi

(57) ABSTRACT

A card ejector comprises a frame (10) having a support section (11) for guiding and supporting a removable card (C) and a guide plate (23) extending substantially parallel to said support section (11) and having a guiding slot (24); an ejector lever (39) provided on said frame (10) for ejecting the card (C); a first push rod (31) made of a flat metal sheet and provided in parallel to said guide plate (30) for sliding therealong upon depression; a second push rod (32) made of a flat metal sheet and provided in parallel to said guide plate (23) for transmitting a force from said first push rod (31) to said ejector lever (39); and a cam member (40) provided behind said first rod (31) so as to face said second rod (32) for engagement with said guiding slot (24) such that when said first rod (31) is depressed, said second rod (32) pushes said ejector lever (39) for rotation, thereby pushing said card (C) for ejection.

7 Claims, 8 Drawing Sheets

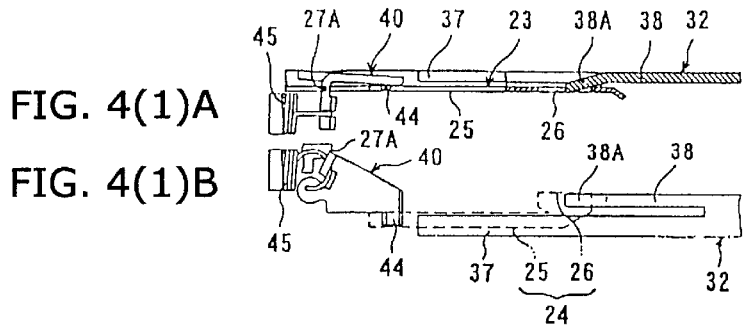
FIG. 4(1)A
FIG. 4(1)B
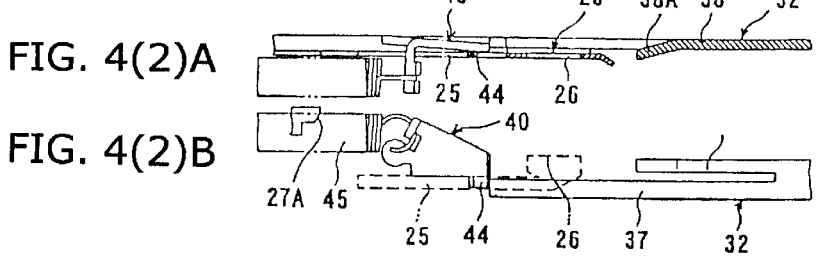
FIG. 4(2)A
FIG. 4(2)B
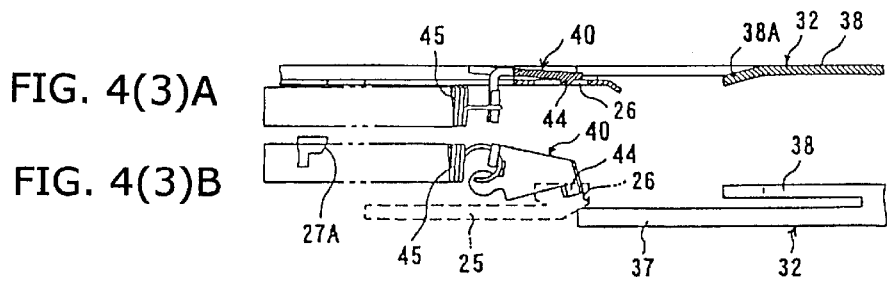
FIG. 4(3)A
FIG. 4(3)B
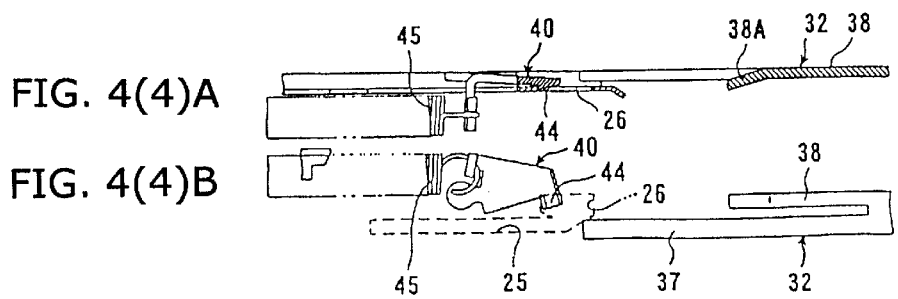
FIG. 4(4)A
FIG. 4(4)B

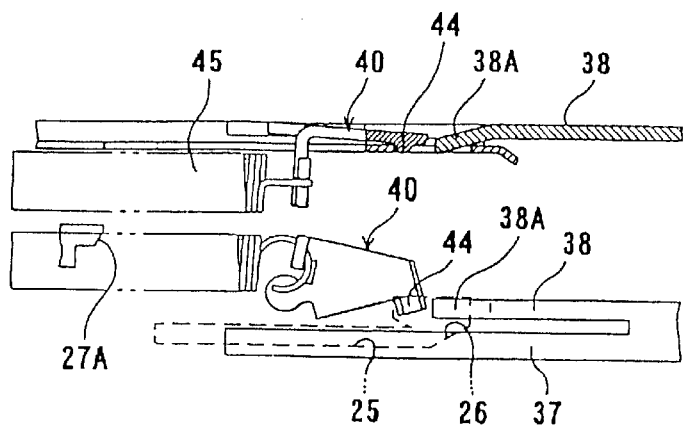
FIG. 5(1)A
FIG. 5(1)B
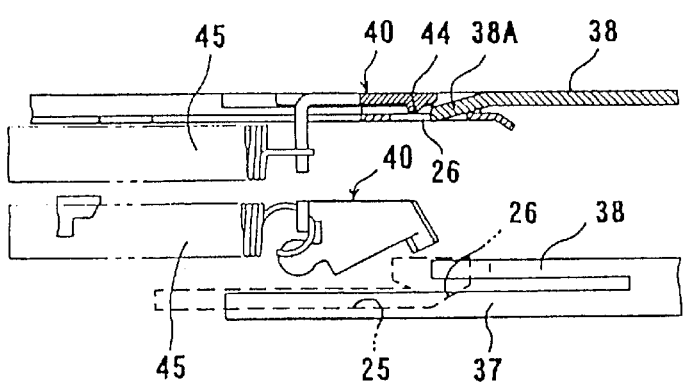
FIG. 5(2)A
FIG. 5(2)B
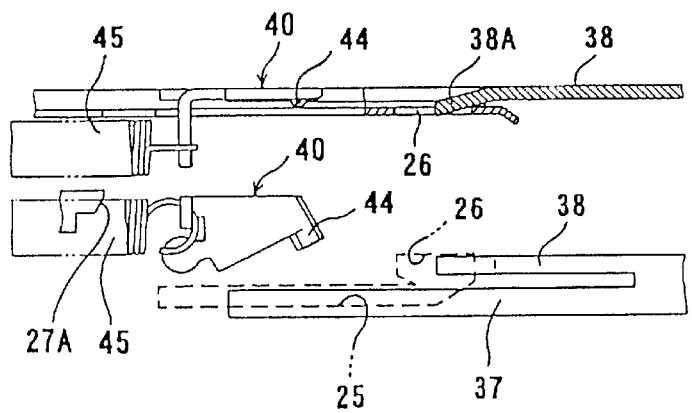
FIG. 5(3)A
FIG. 5(3)B

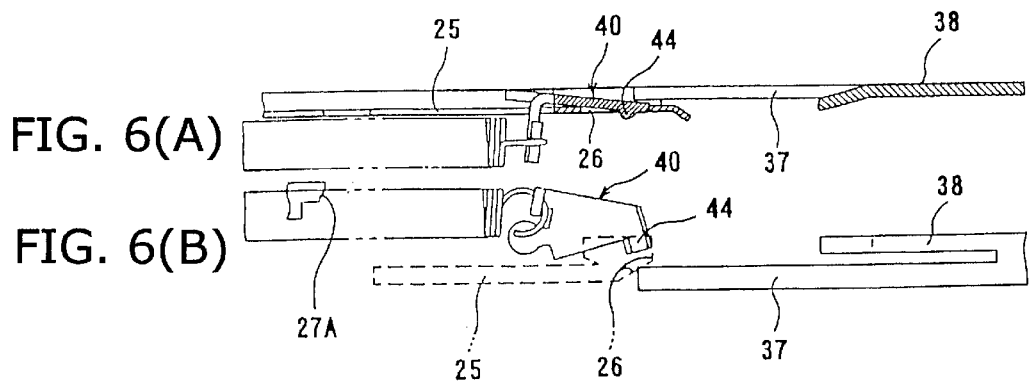

CARD EJECTOR

BACKGROUND OF THE INVENTION

1. Field of the Invention

The present invention relates to card ejectors for ejecting cards from electronic equipment.

2. Description of the Related Art

Japanese patent application Kokai No. 11-219756 discloses a card ejector of this type. The card ejector comprises a frame for guiding and supporting a removable card, a push rod provided on a side of the frame for sliding on the frame, and an ejector lever pushed by the push rod to eject the card.

The push rod comprises a first rod depressed by the operator, a second rod for transmitting the force to the ejector lever, and an intermediate member for engaging the rods. The intermediate member is supported by the first rod for rotation between an engaging position to engage the second rod and a release position to release the engagement. The rotation of the intermediate member is made by the circular movement of a pin section of the intermediate member along a heart-shaped cam channel in step with the reciprocation of the first rod.

The cam channel has a sloped and a stepped bottom to prevent the pin section from moving backward. To eject the card, the intermediate member engages the second rod to move the ejector lever, and the engagement is released thereafter. Under the engagement condition, the push button of the first rod projects from the front face of the equipment but, under the release condition, it is almost flush with the front face.

There has been a demand for a smaller card ejector. The heart-shaped cam member, however, makes the miniaturization difficult. It has a stepped bottom and needs the thick bottom wall. In addition, it has a complicated shape and is made by molding with a resin. The resin is not a rigid material, making the thick wall necessary. Moreover, the heart-shaped cam member needs a number of components, such as a pin section of the intermediate member and a bias member, which in turn requires a large space in which they operate.

SUMMARY OF THE INVENTION

Accordingly, it is an object of the invention to provide a simple, economical, and compact card ejector.

According to the invention there is provided a card ejector which comprises a frame made of a flat metal sheet and having a support section for guiding and supporting a removable card and a guide plate made of a flat metal sheet and extending substantially parallel to said support section and having guiding means, an ejector lever provided on said frame for ejecting a card, a first push rod made of a flat metal sheet and provided in parallel to said guide plate for sliding therealong upon depression, a second push rod made of a flat metal sheet and provided in parallel to said guide plate for transmitting a force from said first push rod to said ejector lever, and a cam member provided behind said first rod so as to face said second rod for engagement with said guiding means such that when said first rod is depressed, said second rod pushes said ejector lever for rotation, thereby pushing said card for ejection. Since the support section of the frame, the first and second push rods are made of a metal sheet and provided in parallel with each other and also the cam member is guided by the guide plate provided in parallel to the support section, it is possible to make the connector small in a direction of the thickness of the metal sheets and the connector is strong because of the material of metal.

BRIEF DESCRIPTION OF THE DRAWINGS

FIGS. 4(1)–(4)A are sectional views of the card ejector taken along the guide slot of a guide plate when a card is ejected;

FIGS. 4(1)–(4)B are side views of the card ejector when a card is ejected;

FIGS. 5(1)–(3)A are sectional views of the card ejector taken along the guide slot of a guide plate when a card is inserted;

FIGS. 5(1)–(3)B are side views of the card ejector when a card is inserted;

FIG. 6(A) is a sectional view of the card ejector taken along the guide slot when no card is inserted;

FIG. 6(B) is a side view of the card ejector when no card is inserted;

DESCRIPTION OF THE PREFERRED EMBODIMENTS

Figure 1:
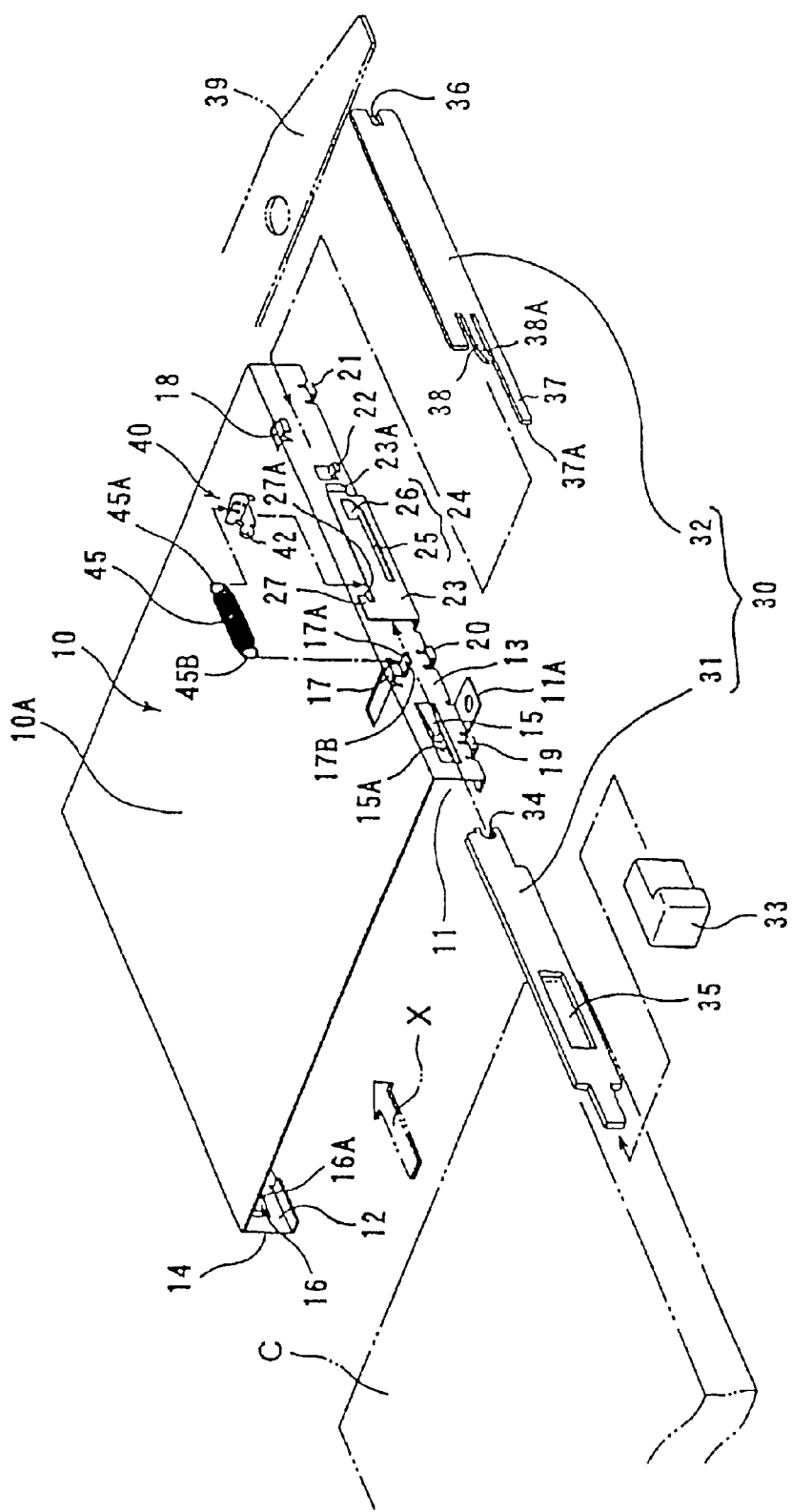
FIG. 1 is an exploded perspective view of a card ejector according to an embodiment of the invention.

In FIG. 1, a frame 10 has a pair of support sections 11 and 12 for supporting a card C, such as a PC card, movable in the direction of an arrow X. The frame 10 is made by stamping and bending a metal sheet such that provide a flat section 10A and the support sections 11 and 12 make a staple-shaped cross-section. The support sections 11 and 12 support the card C on the opposite sides such that the card C is movable in the direction X.

A pair or ground contacts 15 and 16 are provided on side walls 13 and 14 of the support sections 11 and 12, respectively. The ground contacts 15 and 16 have a staple-shaped slit in the side walls 13 and 14 such that they become cantilevered flexible pieces, making inwardly bent contact portions 15A and 16A, respectively, for contact with the ground portions of the inserted card C. An attaching tab 11A extends outwardly from each of the side walls 11 and 12.

In this embodiment, part of an ejector is provided on the support section 11. A pair of U-shaped upper guide pieces 17 and 18 and three U-shaped lower guide pieces 19, 20, and 21 extend outwardly from the side wall 13 for supporting and guiding first and second push rods (later described). Another U-shaped guide piece 22 extends outwardly from the side wall 13 near the lower guide piece 21. The upper guide piece 17 has an outwardly extending engaging portion 17A and an engaging groove 17B behind the engaging portion 17A.

A guide plate 23 extends outwardly from and in parallel to the side wall 13 between the lower guide piece 20 and the guide piece 22 and has a guide slot 24 in its central portion. The guide slot 24 has a horizontal section 25 and a vertical section 26 communicating with the horizontal section 25, making a hook-shaped configuration. An abutting piece 27 extends upwardly from the guide plate 23 and has an inclined edge 27A. An introducing face 23A extends obliquely outwardly from the guide plate 23.

The push rod 30 consists of first and second rods 31 and 32 that are made of a metal sheet so as to provide a flat faces. The first rod 31 is provided with a push button 33 at its front, a semicircular support recess 34 at its rear, and an opening 35 in its middle for allowing flexure of the ground contact 15.

The second rod 32 has a pushing recess 36 at its rear end, and abutment and release arms 37 and 38, respectively, at its front. The abutment arm 37 is made longer than the release arm 38. The abutment and release arms 37 and 38 correspond in height to the horizontal and vertical sections 25 and 26, respectively, of the guide slot 24. The abutment arm 37 has a cam follower 37A at the free end. The release arm 38 has an outwardly inclined free end 38A. The pushing recess 36 engages and pushes an eject lever 39 for rotation, which ejects the card C.

Figure 3:
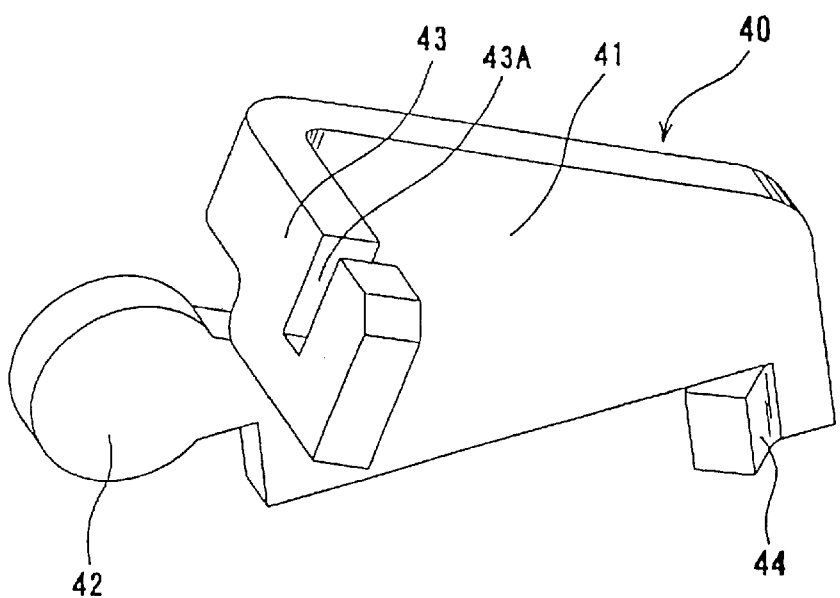
FIG. 3 is an enlarged perspective view of a cam member for the card ejector.

A cam member 40 is provided between the first and second rods 31 and 32. As best shown in FIG. 3, it has a flat body 41, a substantially circular bearing portion 42, and an engaging piece 43 extending laterally from the flat body 41 and has an engaging recess 43A in its upper edge. An engaging bend 44 is provided on the lower edge of the body 41.

The first and second rods 31 and 32 are assembled as follows.

Figure 2:
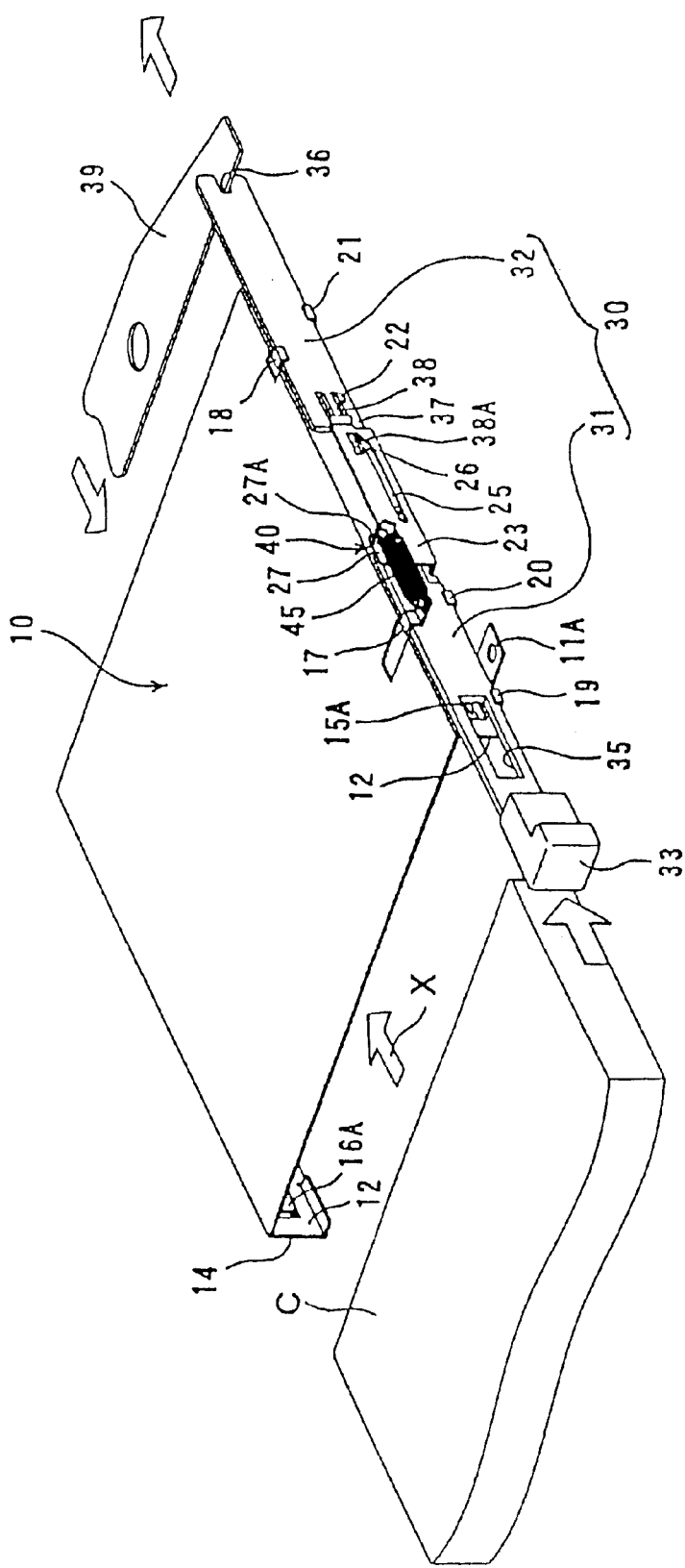
FIG. 2 is a perspective view of the card ejector assembled.

In FIG. 2, the first rod 31 with the push button 33 attached is supported by the upper and lower guide pieces 17, 19, and 20 on the side wall 13 such that the bearing portion 42 of the cam member 40 fits in the support recess 34 for swinging up and down. The cam member 40 is biased by a coil spring 45 with its ends 45A and 45B engaging the engaging recess 43A and the engaging groove 17B, respectively. Under this condition, the engaging bend 44 of the cam member 40 engages the horizontal slot 25 of the guide plate 23 and the contact portion 15A of the ground contact 15 is located in the opening 35 of the first rod 31.

The second rod 32 are supported by the guide pieces 18, 21, and 22 for guidance along the side wall 13, wherein the guide piece 22 is located in a slot between the abutment and releasing arms 37 and 38. The inclined free end 38A of the releasing arm 38 is located in the vertical hook section 26 of the guide plate 23. The first and second rods 31 and 32 and the body section 41 of the cam member are located in the same plane so that the thickness of the ejector rod section is minimized. The joint portion between the guide plate 23 and the frame 10 may be used to support the first and second rods 31 and 32.

The axis of the coil spring 45 is made higher than the guide slot 24, and the engaging groove 17B of the guide piece 17 is located in front of the engaging recess 43A of the cam member 40 so that the engaging recess 43A of the cam member 40 is pulled to rotate the cam member 40 at the bearing portion 42 as a fulcrum. Consequently, the coil spring 45 biases not only forwardly the cam member 40 but also upwardly the engaging portion 44 against the inside of the guide plate 23.

The operation of the card ejector will be described with reference to FIGS. 4(1)A through 5(3)B.

In FIGS. 4(1)A and B, the card is being inserted and connected to the connector. The cam member 40 is pulled by the coil spring 45 to a retreated position where it abuts on the abutment face 27A of the guide plate 23. Under this condition, the push button 33 of the first rod 31 projects from the front panel of equipment. The engaging portion 44 of the cam member 40 is located at a retreated position in the horizontal slot section 25 of the guide slot 24 to be opposed to the abutment arm 37 of the second rod 32.

Then, to eject the card, the push button 33 is depressed against the coil spring 45 to move the first rod 31 rearwardly so that the engaging portion 44 of the cam member 40 moves in the hook section 26 as shown in FIGS. 4(1)A and B through FIGS. 4(3)A and B. The rearward movement of the engaging portion 44 moves rearwardly the second rod 32. This rearward movement rotates the ejector lever 39 to bring the card forward to a position from which the card can be removed.

Since the cam member 40 is biased by the coil spring 45 forwardly and upwardly, the engaging portion 44 enters the vertical hook section 26 as shown in FIGS. 4(3)A and B and retrieves to the position shown in FIGS. 4(4)A and B. The engaging portion 44 is guided into the hook section 26 by the inclined rear end of the horizontal straight section 25. Under this condition, the push button 33 no longer projects from the equipment panel.

When the card is inserted into the connector for connection, the ejector lever 39 rotates clockwise to push the second rod 32 forwardly. The engaging section 44 of the cam member 40 is located above the abutment arm 37 of the second rod 32 but opposed to the release arm 38 as shown in FIGS. 5(1)A and B. This is the normal condition where the card is inserted in electronic equipment for use. When the card is inserted in the frame 10, its side faces make spring contact with the ground contacts 15 and 16 provided on the side walls 13 and 14. Consequently, the ground contacts 15 and 16 are flexed outwardly into the opening 35 of the first rod 31 so that it is possible to provide the frame 10 and the push rod 30 closely.

When the push button 33 is depressed to eject the card, moving the first rod 31 and the cam member 40 rearwardly, the inclined portion 38A of the release arm 38 pushes the engaging section 44 of the cam member 40 in such a direction that the engaging section 44 is released from the hook section 26 of the guide slot 24. Since the cam member 40 is biased by the coil spring 45 forwardly and upwardly, the engaging section 44 slides forwardly along the guide member from the position of FIGS. 5(2)A and B to FIGS. 5(3)A and B, with the cam member 40 not interacting with the second rod 32. Consequently, the second rod 32 remains at the position of FIGS. 5(1)A and B. The opening 35 of the first rod 31 is sufficiently long to avoid interference between the first rod 31 and the ground contacts 15 and 16.

When the cam member 40 is further moved forwardly, it abuts against the abutment edge 27A of the guide plate 23 for clockwise rotation. Consequently, the engaging section 44 slides downwardly on the guide plate 23 to enter the horizontal straight section 25 of the guide slot 24, returning to the condition of FIGS. 4(1)A and B and being ready for another card rejection operation.

Where no card is inserted, the second rod 32 is not pushed by the ejector lever 39 and remains at the position of FIGS. 4(4)A and B, where the push button 33 does not project from the panel. If the push button 33 is depressed, the release arm 38 is at the rear position and does not make interference so that the cam member 40 moves within the range of the hook section 26 of the guide slot 24 as shown in FIGS. 6(A) and (B) and does not engage the second rod 32. Thus, if the push button 33 is depressed where no card is inserted, it does not project. That is, it projects only when the inserted card is ejected, thus preventing interference with operator.

Figure 7:
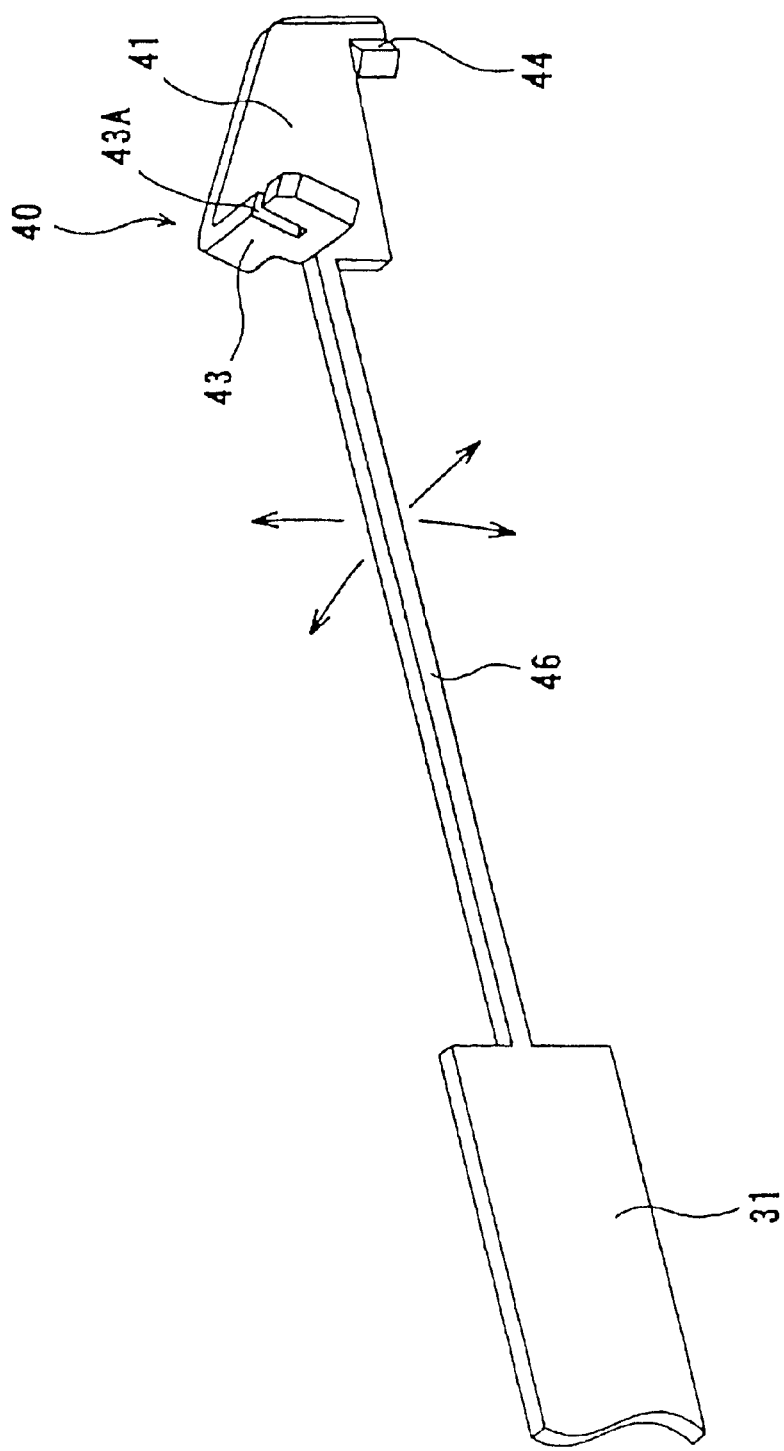
FIG. 7 is a perspective view of a push rod and a cam member according to another embodiment of the invention.

In FIG. 7, this embodiment is characterized that the cam member 40 is made together with the first rod 31 as a unit. A spring arm 46, which replaces the coil spring, links the first rod 31 and the cam member 40 as a unit. By setting the no-load position of the engaging section 44 above and outside the guide slot, the spring arm 46 is made flexible in two directions perpendicular to the longitudinal direction of the spring arm 46 to bias the engaging section 44 in those directions. The coil spring 45 biases the cam member 40 in the three directions, but the spring arm 46 joins the first rod 31 and the cam member 40 as a unit so that no bias is needed in the upward direction.

Figure 8:
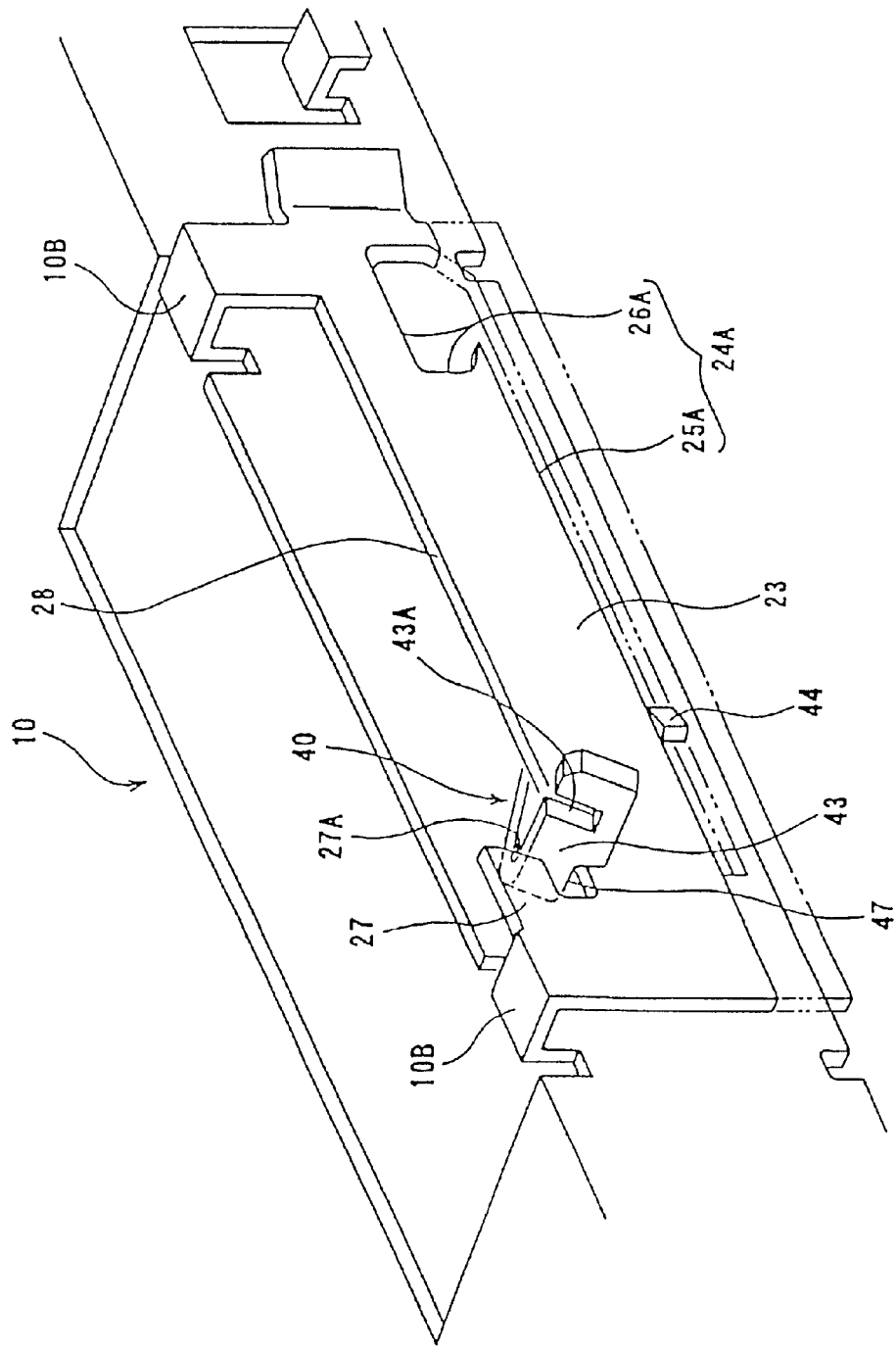
FIG. 8 is a perspective view of a card ejector according to still another embodiment of the invention.

In FIG. 8, according to this third embodiment, a guiding edge 24A, which corresponds to the guide slot 24, is provided in the guide plate 23 that is linked to the upper edge of the frame 1 by engaging pieces 10B. The guiding edge 24A has a straight edge section 25A, which corresponds to the straight slot section 25, and a hook section 26A, which corresponds to the hook section 26 of FIG. 1. In other words, the guiding edge 24A is made by cutting off such a portion of the guide plate as indicated by dotted line in FIG. 8.

An auxiliary guide section 47 is provided on the lower edge of the engaging piece 43 for engagement with the upper guiding edge 28 of the guide plate 23. An inclined abutment edge 27A, which is similar to the one 27A shown in FIG. 1, is provided on the rear edge of the abutment piece 27.

In operation, when the cam member 40 is pushed rearwardly by the first rod 31, the engaging section 44 slides along the straight edge section 25A to the hook section 26A, with the auxiliary guide section 47 sliding on the upper guiding edge 28. The cam member 40 is biased by a coil spring similar to that of FIG. 1 so that when the engaging section 44 reaches the hook section 26A, it abuts against the upper edge of the hook section 26A. Then, when the engaging section 44 is released from the hook section 26 by the release arm 38 of the second rod 32, it slides on the inside face of the guide plate 23, allowing forward movement of the cam member 40. At the uttermost front position, the engaging piece 43 abuts against the inclined abutment edge 27A, rotating the cam member 40 clockwise so that the engaging section 44 engages again the straight edge section 25A.

Many variations may be made to the invention. For example, the engaging section of the cam member 40 in FIG. 1, which moves forward along the guide plate 23, may be made so as to engage another groove for forward movement. Consequently, it is moved from the guide slot 24 to the other groove by the release arm 38 of the second rod 32 and returned to the guide slot 24 from the other groove by the abutment edge 27A. The guide plate 23 may be a separate member from the frame 10 and be attached to the frame.

As has been described above, according to the invention, the push rod for ejecting the ejector lever is made up of the first and second rods which operate via a cam member. The guide plate with a guide slot and the rods and the cam member are made flat and parallel to each other to minimize the thickness of the ejector. The guide plate made of a metal sheet, which is strong and thin, further minimizes the ejector. The guide plate, which is made in a simple press, minimizes the process cost and the number of components. Even if the ground contact is provided on the guiding face of the frame, the guiding face can be provided close to the push rod, thus minimizing the thickness of the ejector.

What is claimed is:

1. A card ejector comprising:
a frame made of a flat metal sheet and having a support section for guiding and supporting a removable card and a guide plate made of a flat metal sheet and extending substantially parallel to said support section and having a guide slot or guide edges;
an ejector lever provided on a rear side of said frame for ejecting a card;
a first push rod made of a flat metal sheet and provided in parallel to said guide plate for sliding therealong upon depression;
a second push rod made of a flat metal sheet and provided in parallel to said guide plate for transmitting a force from said first push rod to said ejector lever; and
a cam member provided behind said first rod so as to face said second rod for engagement with said guide slot or guide edges such that when said first rod is depressed, said second rod pushes said ejector lever for rotation, thereby pushing said card for ejection.

2. The card ejector according to claim 1, wherein said cam member is movable between an engaging position where said cam member engages said guide slot or guide edges and transmits said force from said first rod to said second rod and a release position where said cam member disengages said guide slot or guide edge and, then, slides forwardly on said guide plate.

3. The card ejector according to claim 2, wherein said guide plate is spaced from said support section by a predetermined distance to accommodate said first and second rods and said cam member therein.

4. A card ejector comprising:
a frame having a support section for guiding and supporting a removable card and a guide plate extending substantially parallel to said support section and having guiding means;
an ejector lever provided on said frame for ejecting a card;
a first push rod made of a flat metal sheet and provided in parallel to said guide plate for sliding therealong upon depression;
a second push rod made of a flat metal sheet and provided in parallel to said guide plate for transmitting a force from said first push rod to said ejector lever; and
a cam member provided behind said first rod so as to face said second rod for engagement with said guiding means such that when said first rod is depressed, said second rod pushes said ejector lever for rotation, thereby pushing said card for ejection, wherein said cam member is movable between an engaging position where it engages said guide means and transmits said force from said first rod to said second rod and a release position where it moves in a thicknesswise direction of said guide plate to disengage said guiding means and, then, slides forwardly on said guide plate, said card connector further comprises spring means for biasing said cam member in a first direction where said card is ejected, a second direction where said cam member is moved for release from said guide means, and a third direction where said cam member is pressed against said guide plate.

5. The card ejector according to claim 1, wherein said guide slot comprises:
a straight section extending in a direction where said cam member moves in straight and
a hook section communicating with said straight section where said engaging section of said cam member is located when said second rod is moved to a rearmost position.

6. A card ejector comprising:
a frame having a support section for guiding and supporting a removable card and a guide plate extending substantially parallel to said support section and having guiding means;

an ejector lever provided on said frame for ejecting a card;

a first push rod made of a flat metal sheet and provided in parallel to said guide plate for sliding therealong upon depression;

a second push rod made of a flat metal sheet and provided in parallel to said guide plate for transmitting a force from said first push rod to said ejector lever; and a cam member provided behind said first rod so as to face said second rod for engagement with said guiding means such that when said first rod is depressed, said second rod pushes said ejector lever for rotation, thereby pushing said card for ejection, wherein said cam member is movable between an engaging position where it engages said guide means and transmits said force from said first rod to said second rod and a release position where it moves in a thicknesswise direction of said guide plate to disengage said guiding means and, then, slides forwardly on said guide plate, wherein said second rod comprises:

an abutment arm for abutment with said cam member; and a release arm having an inclined end for releasing said cam member from said guide means.

7. A card ejector comprising:

a frame made of a flat metal sheet and having a support section for guiding and supporting a removable card and a guide plate made of a flat metal sheet and extending substantially parallel to said support section and having guide means;

a push rod made of a flat metal sheet and sliding along said support section;

an ejector lever attached to a rear end of said push rod and being driven by said push rod so as to eject said removable card;

a flexible ground contact provided on said frame for spring contact with said removable card; and an opening provided in said push rod into which said ground contact is flexed upon said spring contact with said removable card.

* * * * *